United States Patent
Dschida et al.

(10) Patent No.: US 9,551,416 B2
(45) Date of Patent: Jan. 24, 2017

(54) METHOD FOR CHANGING GEAR STAGES AND TRANSMISSION ARRANGEMENT

(75) Inventors: Peter Dschida, Ulm (DE); Frank Riggenmann, Pfaffenhofen (DE); Karl-Heinz Vogl, Ummendorf (DE); Michael Frasch, Ulm (DE); Heinz Hense, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 537 days.

(21) Appl. No.: 12/737,948

(22) PCT Filed: Aug. 5, 2009

(86) PCT No.: PCT/EP2009/005679
§ 371 (c)(1),
(2), (4) Date: Mar. 17, 2011

(87) PCT Pub. No.: WO2010/025801
PCT Pub. Date: Mar. 11, 2010

(65) Prior Publication Data
US 2011/0172888 A1    Jul. 14, 2011

(30) Foreign Application Priority Data
Sep. 3, 2008   (DE) ................. 10 2008 045 536

(51) Int. Cl.
*F16H 61/47*   (2010.01)
*F16H 61/04*   (2006.01)
*F16H 59/70*   (2006.01)

(52) U.S. Cl.
CPC .......... *F16H 61/47* (2013.01); *F16H 61/0403* (2013.01); *F16H 59/70* (2013.01);
(Continued)

(58) Field of Classification Search
CPC ...... F16H 61/0403; F16H 61/47; F16H 59/70; F16H 2059/706; F16H 2200/0034; F16H 2061/047; F16H 47/00; F16H 47/02; F16H 2047/025; F16H 47/04; F16H 2047/045; F16H 47/06; F16H 47/07; F16H 47/10; F16H 47/08; F16H 47/065; F16H 47/085; F16H 47/12; F16H 39/00; F16H 2039/005; F16H 39/10; F16H 2039/105; F16H 39/12; F16H 39/14; F16H 39/16; F16H 39/18; F16H 39/20; F16H 39/22; F16H 39/24; F16H 39/26; F16H 39/28; F16H 39/30; F16H 39/32; F16H 39/34; F16H 39/36; F16H 39/38; F16H 39/40; F16H 39/42
(Continued)

(56) References Cited

U.S. PATENT DOCUMENTS 6,202,016 B1   3/2001   Stephenson et al.
6,442,934 B1 *  9/2002   Okuda ................ F04B 49/002
                                                60/451
(Continued)

FOREIGN PATENT DOCUMENTS

DE   102005058937   5/2007
EP     1076194 A2   2/2001
(Continued)

*Primary Examiner* — John Q Nguyen
*Assistant Examiner* — Jordan S Fei
(74) *Attorney, Agent, or Firm* — Michael Best & Friedrich LLP

(57) ABSTRACT

The invention relates to a method for changing gear stages in a transmission having a hydrostatic transmission and a downstream manual transmission, and a corresponding transmission arrangement. First, a desire to shift is detected within the manual transmission to change the gear stages. The hydrostatic transmission and the downstream manual transmission are activated to change the gear stage of the downstream transmission. Whether the gear stage to be
(Continued)

engaged through a gear stage change was successfully engaged is detected by a detection device, which is connected to an electronic control unit of the transmission arrangement. If the engagement of the gear stage to be engaged is not successful, the original gear stage is reengaged. After the engagement of the original gear stage, the downstream transmission is again activated such that the gear stage to be engaged is engaged.

16 Claims, 2 Drawing Sheets

(52) U.S. Cl.
CPC .. *F16H 2059/706* (2013.01); *F16H 2061/047* (2013.01); *F16H 2200/0034* (2013.01); *Y10T 74/20018* (2015.01)

(58) Field of Classification Search
USPC .......................................................... 701/51
See application file for complete search history.

(56) References Cited

U.S. PATENT DOCUMENTS

| | | |
|---|---|---|
| 2001/0041645 A1 | 11/2001 | Nanri et al. |
| 2002/0121399 A1 | 9/2002 | Bohrer |
| 2008/0154467 A1 | 6/2008 | Evans et al. |
| 2008/0234105 A1* | 9/2008 | Sakamoto et al. ............ 477/124 |

FOREIGN PATENT DOCUMENTS

| | | |
|---|---|---|
| EP | 1236933 A2 | 9/2002 |
| EP | 1936243 A1 | 6/2008 |

* cited by examiner

METHOD FOR CHANGING GEAR STAGES AND TRANSMISSION ARRANGEMENT

CROSS-REFERENCE TO RELATED APPLICATION

This application is a 35 USC 371 application of PCT/EP 2009/005679 filed on Aug. 5, 2009.

BACKGROUND OF THE INVENTION

Field of the Invention

The present invention is based on a hand-held power tool.

Description of the Prior Art

DE 10 2005 058 937 A1 has disclosed a drive unit with a hydrostatic transmission and a manual transmission connected thereto. Such transmission arrangements are used, for example, for drive units in construction, farming, and forestry machines or the like. The manual transmission downstream of the hydrostatic transmission has at least two gear stages, during the shifting of which, a synchronizing device adapts the rotation speed of the hydraulic motor of the hydrostatic transmission to the respective driving situation and therefore to the rotation speed of the transmission input shaft of the downstream manual transmission. In order to facilitate this rotation speed adaptation, to avoid shifting jolts, and to improve overall driving comfort while reducing the load and therefore wear on the transmission arrangement, the above-cited patent application proposes adjusting the hydrostatic motor during the shifting procedure so that the rotation speed of the hydraulic motor is slightly greater than the rotation speed that precisely matches a driving situation. Once the rotation speed of the hydraulic motor has been correspondingly increased, then the downstream manual transmission is shifted into the intended gear.

In the above-described transmission arrangement and method for engaging a gear stage in the downstream manual transmission, it is problematic that in certain situations, it is not possible to assure reliable engagement of the intended gear. In particular, for example due to temperature fluctuations and production tolerances, it is not possible to successfully shift into the intended gear predetermined by the vehicle operator. However, in this transmission arrangement and method for shifting gears, no measures are provided for detecting the correct engagement of a gear stage. It is therefore finally left up to the operator to monitor the correct engagement of a gear stage and if need be, to repeat the gear shifting procedure.

OBJECT AND SUMMARY OF THE INVENTION

The object of the invention, therefore, is to create a method for changing gear stages in a manual transmission connected downstream of a hydrostatic transmission and to create a corresponding transmission arrangement.

This object is attained by means of the method according to the invention and by means of the transmission arrangement according to the invention.

With the method for changing gear stages according to the invention, in a transmission arrangement with a hydrostatic transmission and a downstream manual transmission connected thereto, first a shift request is detected. Such a shift request can be executed directly by means of an operator input, as is customary in commercial vehicles such as agricultural or forestry machines. In this case, an operator uses a selector lever to select either a working gear or a fast gear, for example. Because of the detected shift request, the hydrostatic transmission and the downstream manual transmission are triggered so that a change in gear stages occurs. This gear stage change itself is embodied in an intrinsically known fashion. According to the invention, a detection procedure is then carried out to ascertain whether the gear stage change was successful, i.e. the downstream transmission was successfully shifted into the intended gear stage based on the detected shift request. If the detection procedure establishes that the intended gear was not successfully engaged, then the transmission is shifted back into the original gear stage. In this context, the original gear stage is the gear stage of the downstream transmission that was engaged at the time that the shift request was detected. After the transmission has been shifted back into the original gear stage, the system then automatically repeats the attempt, without intervention by the operator, to shift the downstream manual transmission into the intended gear stage in order to execute the detected shift request of the operator.

The shifting back into the original gear stage often results in the fact that for example strains in the transmission, which result in the failure to shift into the intended gear, can be overcome so that in a subsequent shifting attempt, it is in fact possible to shift into the intended gear. The shifting back into the original gear in this case occurs without further action by the operator. The user action can be limited to a single input of a corresponding shift request. If it is not possible to immediately and easily shift the transmission into the intended gear, then the transmission arrangement automatically first shifts back into the original gear before making a new attempt to shift into the gear stage corresponding to the shift request.

Correspondingly, the transmission arrangement has a hydrostatic transmission and a manual transmission connected thereto. The manual transmission has at least one first gear stage and one second gear stage, for example a working gear and a fast gear. In addition, a detection device is provided for detecting a shifting state of the transmission; this detection device is connected to an electronic control unit. The detection device determines the shifting state of the transmission and transmits this to the electronic control unit. The electronic control unit is therefore able to detect whether a gear stage corresponding to the shift request has been successfully engaged or not. It is thus possible, based on the determined shifting state of the manual transmission, for the electronic control unit to decide whether the transmission must be shifted back into the original gear before another attempt is made to change the gear stages in, the downstream manual transmission. As explained in greater detail in connection with the exemplary embodiment, such a detection device can, for example, be a position signal generator of a sliding gear in the manual transmission or a position detection device for an actuating device connected to the sliding gear.

In order to avoid large jumps in rotation speed that must be compensated for by the synchronizing device of the downstream manual transmission, it is particularly advantageous when shifting into the original gear stage to simultaneously pivot the hydraulic motor for the synchronization so that its rotation speed corresponds to a target rotation speed for the engagement of this gear stage. This target rotation speed can be the rotation speed that corresponds exactly to the synchronizing rotation speed of an output shaft of the hydraulic motor with an input shaft of the downstream manual transmission. It is, however, also possible to establish a different target rotation speed based on the synchronizing rotation speed, as is known for example from the above-cited DE 10 2005 058 937 A1. In this case, the target rotation speed of the hydraulic motor is slightly greater than the synchronizing rotation speed so that an approach to the rotation speed of the hydraulic motor by the synchronizing device of the downstream manual transmission occurs "from above."

Before the renewed triggering of the manual transmission for shifting it into the intended gear stage, then, it is particularly preferable to pivot the hydraulic motor so that its rotation speed corresponds to a target rotation speed for the engagement of this intended gear stage. The determination of the target rotation speed and triggering of the hydraulic motor in this case occurs automatically by means of the electronic control unit, therefore requiring no action on the part of an operator of the vehicle or drive unit. In the context of the present invention, pivoting is generally understood to be adjusting the displacement of the hydraulic motor.

Even in the presence of a shift request, the hydrostatic transmission and the downstream manual transmission are preferably only actuated and triggered to shift the gear stages when the drive train is within a permissible shifting window. The definition and monitoring of a permissible shifting window prevents, for example, the execution of a downshift that would result in an impermissibly high rotation speed of the hydraulic motor or a critical input rotation speed of the manual transmission. In this case, for each gear stage of the downstream manual transmission, the shifting window individually establishes the vehicle speed—in the case of a drive unit—at which a gear stage is permissible. A shift into this gear stage is executed only within this vehicle speed range. In this connection, it is particularly preferable to detect a vehicle speed parameter and compare it to a parameter range that is dependent on the intended gear. Such a vehicle speed parameter can, for example, be a rotation speed of the output shaft of the downstream manual transmission. It is likewise conceivable, however, for another parameter related to the speed of the driven vehicle to be used as a vehicle speed parameter. For example, it is possible to directly use a speedometer signal. The vehicle speed parameter can also be indirectly calculated by calculating based on the known transmission ratio of the intended gear stage and based on the known hydraulic motor rotation speed before the detection of a shift request.

Preferably, a position signal is imported in order to determine whether an intended gear stage has been successfully engaged. This position signal transmits information regarding a shifting position of the downstream manual transmission. Possibilities for detecting the shifting position of the downstream transmission include, for example, monitoring the position of a device that executes the gear change in the transmission. In the case of a conventional manual transmission, this can be the sliding gear, which connects the respective idler gear of a gear stage to the transmission shaft for co-rotation therewith. The detection of the position of such a sliding gear can take place either indirectly through detection of the position of the associated actuating device or directly in the transmission through detection of the position of the sliding gear.

In order to determine whether the intended gear stage has been successfully engaged, preferably the position signal is imported only after the expiration of a fixed time interval after detection of the shift request. In a successfully executed gear stage change, the time diagrams of the transmission are essentially always constant thanks to the automated sequence. Consequently as a rule, the shifting procedure is completed a certain amount of time after the detection of the shift request or after reentry into the shifting window. After this time, the position signal is imported and it is possible to immediately determine whether the shifting procedure was successful, i.e. whether the intended gear stage was in fact successfully engaged.

Preferably, a number of successive unsuccessful attempts to shift into the intended gear is detected. When a cancellation criterion such as a maximum number of unsuccessful attempts to shift into a gear is reached, the transmission is shifted back into the original gear and a new attempt to shift into the intended gear actually based on the shift request is only made if a new shift request is detected.

The electronic control unit of the transmission arrangement preferably has a comparing device for comparing a vehicle speed parameter to a parameter range that is dependent on the intended gear. In addition, the electronic control unit is preferably connected to a rotation speed sensor for detecting the output shaft rotation speed of the downstream manual transmission. In this way, the electronic control unit has access to all of the information necessary to automatically monitor the shifting window for the respective intended gear and to correspondingly switch over to a standby status when a shift request is made even though the vehicle is outside the corresponding shifting window. In such a case, the reentry into the shifting window, for example due to braking of the vehicle when downshifting, is detected and after the reentry into the shifting window, the procedure for shifting the gears is carried out automatically and independently. The electronic control unit also has a determining section that determines the target rotation speed of the hydraulic motor with regard to the next intended gear of the downstream manual transmission. According to the method, this next intended gear can be either the original gear or the intended gear based on the shift request. An exemplary embodiment for executing the method according to the invention and a corresponding transmission arrangement are depicted in the drawings and will be explained in greater detail in the description that follows.

DESCRIPTION OF THE PREFERRED EMBODIMENT

Figure 1:
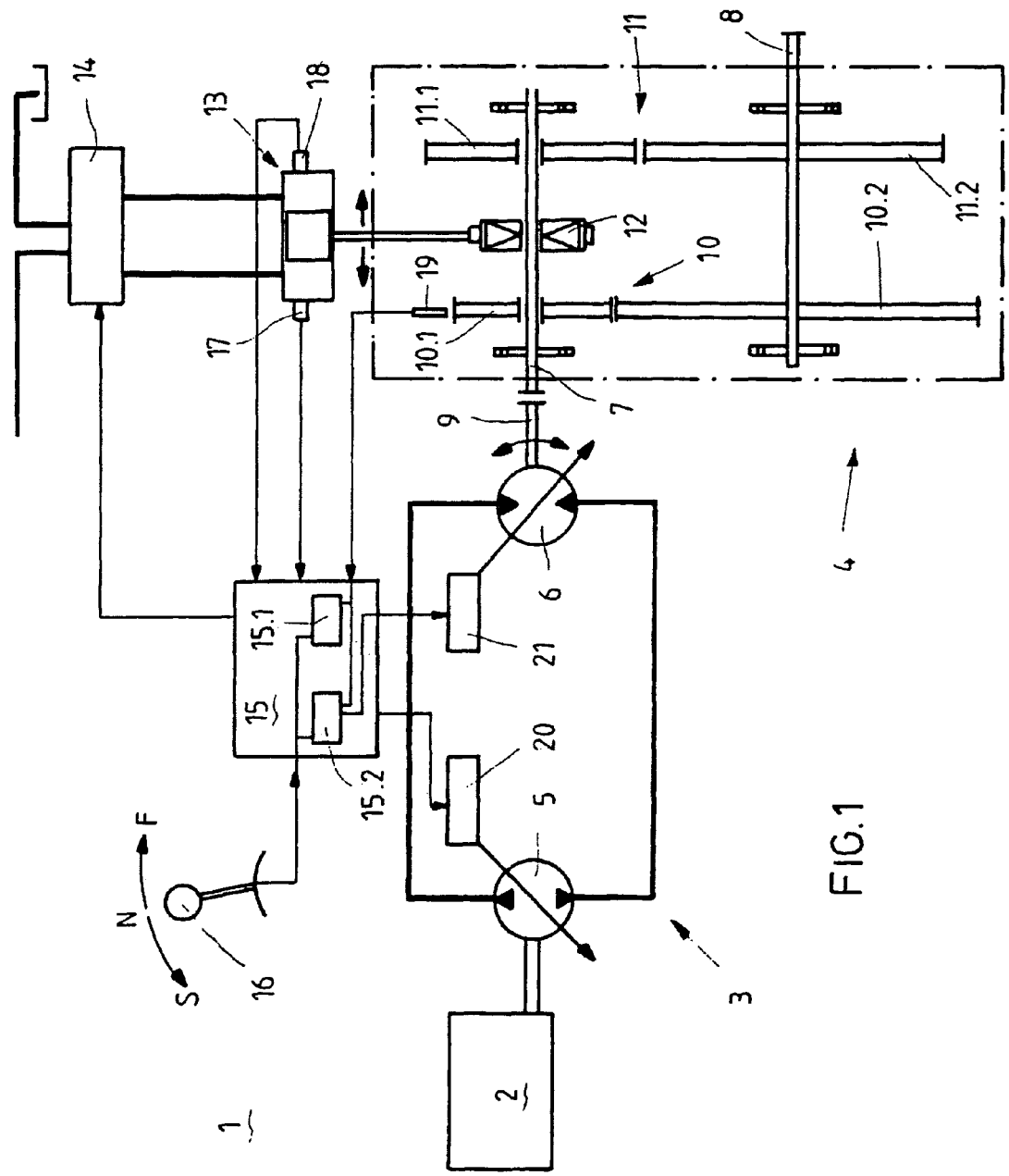
FIG. 1 is a schematic depiction of a drive unit with a transmission arrangement according to the invention for executing the method according to the invention.

A very simplified drive unit 1 of the kind used for example in construction, agricultural, or forestry machines includes a drive motor 2, which is as a rule embodied in the form of a diesel combustion engine. This drive motor 2 for producing a primary drive moment is connected to a hydrostatic transmission 3. The other end of the hydrostatic transmission 3 is connected to a downstream manual transmission 4. The downstream manual transmission 4, which has at least two gear stages 10, 11, makes it possible to expand the achievable vehicle speed range of the vehicle driven by means of the drive unit 1.

The transmission ratio of the hydrostatic transmission 3 is infinitely adjustable. To this end, the drive motor 2 drives an adjustable displacement hydraulic pump 5 via a mechanical connection. In the exemplary embodiment shown, the hydraulic pump 5 is connected in a closed hydraulic circuit with a likewise adjustable hydraulic motor 6. The hydraulic pump 5 and hydraulic motor 6 are preferably axial piston machines of the oblique-axis or swash plate type.

In the exemplary embodiment shown in which the downstream manual transmission 4 has only two gear stages, the manual transmission 4 is provided with a transmission input shaft 7 and a transmission output shaft 8. The transmission input shaft 7 is connected to a hydraulic motor output shaft 9. In order to implement the first gear stage 10 and second gear stage 11, a gear pair is provided for each. The gear pair of the first gear stage 10 has a first idler gear 10.1 and a first fixed gear 10.2. In a corresponding fashion, the second gear stage 11 has a gear pair with a second idler gear 11.1 and a second fixed gear 11.2. The two fixed gears 10.2 and 11.2 are permanently affixed to the transmission output shaft 8 for co-rotation therewith. By contrast, the two idler gears 10.1 and 11.1 are able to rotate relative to the transmission input shaft 7. The first idler gear 10.1 permanently engages with the first fixed gear 10.2. The second idler gear 11.1 permanently engages with the second fixed gear 11.2.

A sliding gear 12 is provided for producing a rotationally fixed connection between one of the two idler gears 10.1 or 11.1 and the transmission input shaft 7 and thus to engage the first gear stage 10 or the second gear stage 11.

The sliding gear 12, which is connected to the transmission input shaft 7 in a permanently rotationally fixed, but axially movable fashion, can be brought into engagement with one of the two idler gears 10.1 or 11.1 in a manner not depicted. This produces a rotation speed adjustment between the respective idler gear 10.1 or 11.1 and the sliding gear 12 by means of a synchronizing device. In this way, the rotation speed of the transmission input shaft 7 and thus lastly of the hydraulic motor 6 are adapted to the rotation speed of the transmission output shaft 8 in accordance with the transmission ratio of the intended gear stage 10 or 11.

An actuating device 13 is provided for actuating the sliding gear 12 and thus changing gear stages 10, 11. In the exemplary embodiment shown, this actuating device is embodied in the form of a double-acting hydraulic cylinder; the pressures in the pressure chambers embodied at both ends of an actuating piston of the actuating device 13 are adjusted by means of a switching valve 14. Actuating devices of this kind are intrinsically known and therefore require no further explanation here.

An electronic control unit 15 is provided for executing and controlling the chronological sequence of the shifting procedure. For example by means of a selector switch 16, this control unit receives a signal based on which the existence of a shift request is determined. In the exemplary embodiment shown, which is equipped with only two gear stages 10, 11, a shift can be executed between a slow gear S and a fast gear F. In addition, a neutral position N can also be provided, which corresponds to the depicted position of the downstream manual transmission 4.

In the exemplary embodiment shown, the actuating device 13 is provided with a first position sensor 17 and a second position sensor 18 for monitoring the shifting state of the downstream manual transmission 4. In the exemplary embodiment shown, the position sensors 17, 18 provided as detection devices are embodied in the form of limit switches. If the actuating piston of the double-acting hydraulic cylinder of the actuating device 13 is in an end position, then this is equivalent to the sliding gear 12 being engaged with either of the first idler gear 10.1 or the second idler gear 11.1. Correspondingly, the first gear stage 10 or second gear stage 11 is engaged.

In addition, a rotation speed sensor 19 is provided for detecting the rotation speed of the transmission output shaft 8. In the exemplary embodiment shown, the rotation speed sensor 19 is situated so that it detects the rotation speed of the first idler gear 10.1. Since the idler gears 10.1 and 11.1, because of the permanent engagement with the respective fixed gear 10.2 or 11.2, also rotate at a rotation speed that is definitely dependent on the rotation speed of the transmission output shaft 8, it is possible for the rotation speed of the transmission output shaft 8 to be detected on the transmission input side.

The electronic control unit 15 is also connected to a first adjusting device 20 and a second adjusting device 21. The first adjusting device 20 acts on an adjusting mechanism of the hydraulic pump 5. In a corresponding way, the second adjusting device 21 acts on an adjusting mechanism of the hydraulic motor 6. By triggering the adjusting devices 20 and 21, it is possible to freely adjust the transmission ratio of the hydrostatic transmission 3 within design-dictated limits.

During a gear stage change, it is preferable to set the hydraulic pump 5 so that a constant pressure prevails in the hydraulic circuit. The hydraulic circuit is depicted in a very schematic fashion. As is generally known for drive units in particular, however, it can also contain additional components, in particular such as feed devices and safety devices for avoiding impermissibly high pressures.

Figure 2:
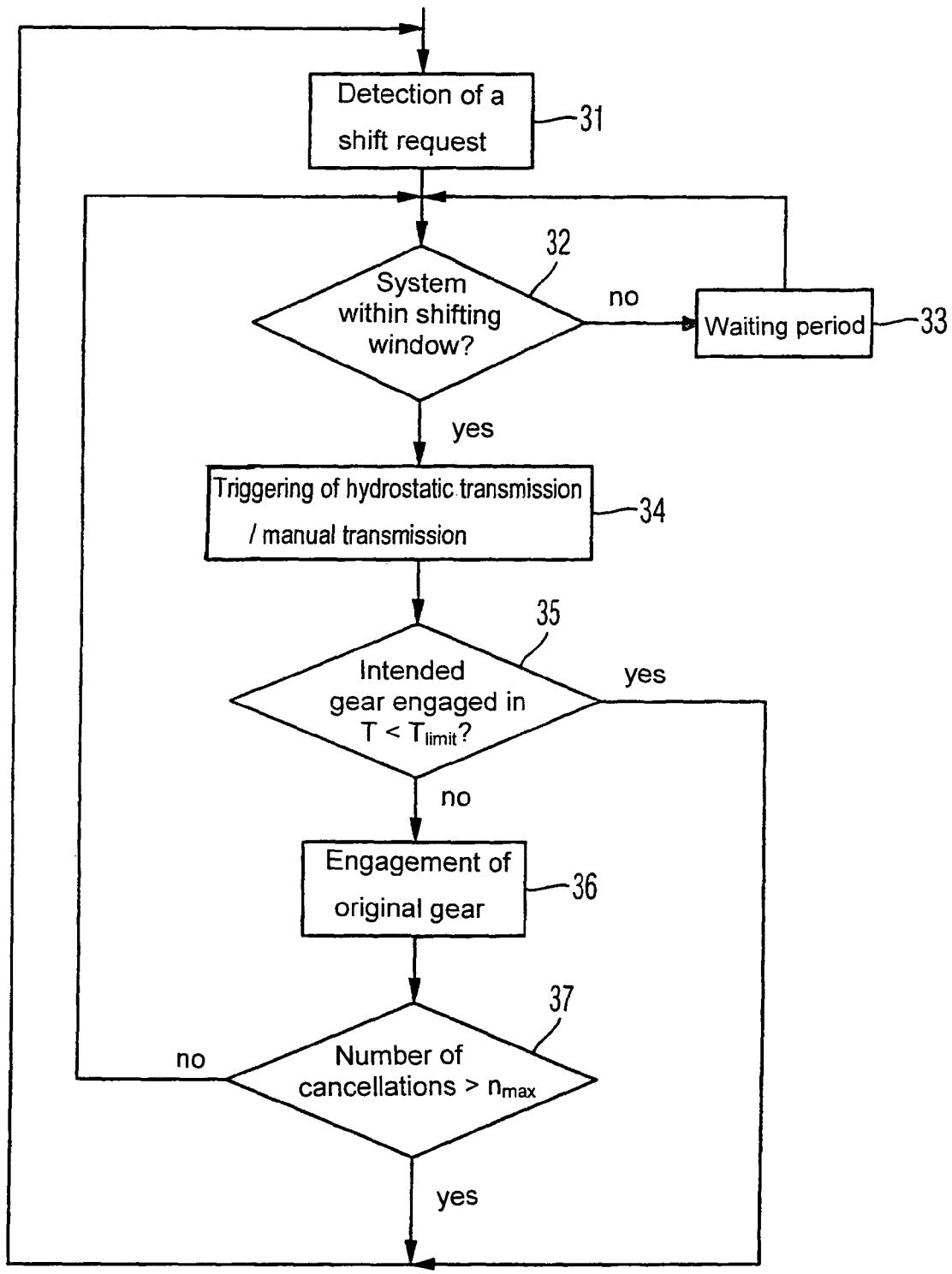
FIG. 2 is a flowchart for illustrating the sequence of the method according to the invention.

Taking into account the depiction in FIG. 1, the sequence of the method according to the invention will now be explained in conjunction with FIG. 2. First, a shift request from an operator is detected (step 31), for example after an actuation of the selector switch 16. The production of a shift request based on a user command should be understood here merely as an example. Such a shift request could, for example, also be produced by means of an additional control device connected to the electronic control unit 15.

If the electronic control unit 15 detects the gear change request, then first, a determination is made as to whether the drive system 1 is within a permissible shifting window. For each gear stage 10, 11, the shifting window establishes the rotation speed of the output shaft 8 at which a shift into this gear stage 10 or 11 is permissible. This shifting window is established individually for each gear stage 10, 11. This query is performed in step 32. This avoids impermissibly high rotation speeds of the hydraulic motor 6 after the gear stage change. A limit can also be set for low rotation speeds.

The electronic control unit 15 has a comparing device 15.1 for this purpose, which is also supplied with the signal of the selector lever 16. In the comparing device 15.1, it is possible to determine the intended gear stage based on the supplied signal of the selector switch 16. It is thus possible to determine a permissible vehicle speed parameter range within which this intended gear stage based on the shift request can actually be engaged. In the example shown, the vehicle speed parameter in the form of the rotation speed signal is determined by the rotation speed sensor 19 and likewise supplied to the comparing device 15.1. If the comparing device 15.1 determines that the system is within the shifting window, then a triggering of the hydrostatic transmission 3 and the downstream manual transmission 4 can occur. For this purpose, corresponding control signals are transmitted to the adjusting devices 20, 21 and the switching valve 14 of the actuating device 13. While the first adjusting device 20 is triggered so that the pressure in the hydrostatic circuit remains essentially constant, the triggering of the second adjusting device 21 adjusts the hydraulic motor 6 so that the rotation speed of the hydraulic motor output shaft 9 corresponds to a target rotation speed. The target rotation speed is the rotation speed at which it is easily possible to execute a synchronization by means of the internal synchronizing device of the downstream manual transmission 4. As explained above, this can either be the actual synchronization speed or a different rotation speed, which is higher or slightly lower than it and is selected based on other criteria. The determination of the target rotation speed of hydraulic motor 6 is made in a determining section 15.2 of the electronic control unit 15. This determining section 15.2 likewise receives a signal from the selector switch 16 as well as the rotation speed signal from the rotation speed sensor 19.

In addition, the actuating device 13 is triggered by means of the switching valve 14 so that the sliding gear 12 is moved toward the intended gear stage 10, 11 based on the pressure conditions prevailing in the actuating device 13. The triggering of the hydrostatic transmission 3 and the manual transmission 4 occurs in step 34. In step 35, a monitoring is carried out to ascertain whether the intended gear based on the shift request has been successfully engaged. For this purpose, depending on which gear stage is intended, a position signal of the first position sensor 17 and/or the second position sensor 18 is imported and the result is evaluated. The importing of the position signal is carried out at a time $T_{limit}$ at which under normal circumstances, the shift into the gear stage 10 or 11 would necessarily be completed. This time $T_{limit}$ can, for example, be determined experimentally. The time window established by the time $T_{limit}$ begins with the start of the shifting procedure. The start of the shifting procedure can either be triggered by the operator inputting a shifting request or be triggered after an unsuccessful shifting attempt when the hydrostatic transmission 3 and the manual transmission 4 are triggered again to change the gear.

However, if the intended gear has been successfully engaged within a time t less than $T_{limit}$, then this is detected based on the position signals, the shifting procedure is terminated, and the procedure is only repeated when another shifting request is input through actuation of the selector switch 16.

If, however, it has been determined that the intended gear has not been successfully engaged within the predetermined time interval at time $T_{limit}$, then in step 36, the transmission is shifted back into the original gear. For the shift back into the original gear, the determining section 15.2 can also determine a target rotation speed of the hydraulic motor 6 for this intended original gear and the second adjusting device 21 can be triggered so that the hydraulic motor 6 is set to the target rotation speed that corresponds to the original gear.

If the original gear is engaged in step 36 because it was not possible to successfully engage the intended gear stage based on the shift request, then a check is performed in step 37 to ascertain the number of successive times the shifting procedure has been canceled. In other words, a count is made as to how often the transmission has been shifted back into the original gear after an unsuccessful shifting attempt. A threshold value $n_{max}$ can be established for a maximum number of these cancellations. The number of cancellations is counted and compared to this threshold value. If the result exceeds the threshold value $n_{max}$, then the original gear remains engaged until a new shift request by means of the selector lever 16 is detected. A new shift request, however, would require a new actuation of the selector lever 16. An automatic additional shifting attempt is not carried out in this case.

However, if the number of cancellations is less than or equal to the maximum number of cancellations $n_{max}$, then the sequence jumps back to step 32 and a check is performed to ascertain whether the system is within the shifting window. If the result is yes, then a renewed attempt to change gear stages can be carried out.

However if the check of the shifting window in step 32 determines that the system is not within the permissible shifting window, then according to step 33, a waiting period is allowed to elapse before a new check of the shifting window is performed. In various situations such as a coasting vehicle, a downshifting can become possible if a desired waiting period is allowed to elapse. For this reason, whenever a shift request is detected outside the shifting window, a waiting period is allowed to elapse before a new check is performed. After the waiting period elapses, if the system is once again within the shifting window, then a gear shift can be executed.

The invention is not limited to the exemplary embodiment shown. Instead, individual features of the method or the transmission arrangements can be advantageously combined with one another.

The invention claimed is:

1. A method for changing gear stages in a transmission equipped with a hydrostatic transmission and a downstream manual transmission, the hydrostatic transmission having a hydraulic pump with a displacement adjustable by a first adjusting device and a hydraulic motor with a displacement adjustable by a second adjusting device whereby the the hydraulic pump and the hydraulic motor are connected to each other in a closed hydraulic circuit, comprising the following method steps:
   detecting of a shift request;
   triggering of the hydrostatic transmission and the downstream manual transmission in order to change a gear stage of the downstream manual transmission, wherein triggering the hydrostatic transmission includes triggering the first adjusting device so that the pressure in the hydraulic circuit remains essentially constant and triggering the second adjusting device so that the rotation speed of the hydraulic motor corresponds to a target rotation speed;
   detecting whether an intended gear stage to be engaged by the gear stage change has been successfully engaged;
   engaging an original gear stage if the intended gear stage has not been successfully engaged; and
   renewing the triggering of the downstream manual transmission in order to engage the intended gear stage,
   wherein after a limited number of successive unsuccessful attempts greater than one to shift into the intended gear stage is detected, the transmission is shifted back into the original gear stage and a new attempt to shift into the intended gear stage is only executed if a new shift request is detected.

2. The method according to claim 1, wherein before renewing the triggering of the shift into the intended gear stage, the hydraulic motor is pivoted so that its rotation speed corresponds to a target rotation speed for engagement of the intended gear stage.

3. The method according to claim 2, wherein a triggering of the hydrostatic transmission and the downstream manual transmission upon detection of a shift request is only carried out if a drive train is within a permissible shifting window.

4. The method according to claim 1, wherein a triggering of the hydrostatic transmission and the downstream manual transmission upon detection of a shift request is only carried out if a drive train is within a permissible shifting window.

5. The method according to claim 4, wherein in order to determine whether the drive train is within the permissible shifting window, a vehicle speed parameter is compared to a parameter range that is dependent on the intended gear stage.

6. The method according to claim 1, wherein in order to determine whether an intended gear stage has been successfully engaged, a position signal relating to a shifting position of the downstream manual transmission is imported.

7. The method according to claim 6, wherein the position signal is imported once a fixed time interval after the start of the shifting procedure has elapsed.

8. The method according to claim 1, wherein upon renewed engagement of the original gear stage, the hydraulic motor is simultaneously pivoted for synchronization so that its rotation speed corresponds to a target rotation speed for engagement of the original gear stage.

9. A transmission arrangement equipped with a hydrostatic transmission and a downstream manual transmission connected to the hydrostatic transmission, having at least one first gear stage and one second gear stage, the hydrostatic transmission having a hydraulic pump with a displacement adjustable by a first adjusting device and a hydraulic motor with a displacement adjustable by a second adjusting device whereby the the hydraulic pump and the hydraulic motor are connected to each other in a closed hydraulic circuit, wherein a detection device is provided which detects a shifting state of the manual transmission and which is connected to an electronic control unit, wherein the electronic control unit is configured to trigger the hydrostatic transmission and the downstream manual transmission in response to detecting a shift request in order to change a gear stage of the downstream manual transmission, the triggering of the hydrostatic transmission including triggering the first adjusting device so that the pressure in the hydraulic circuit remains essentially constant and triggering the second adjusting device so that the rotation speed of the hydraulic motor corresponds to a target rotation speed, and wherein after a limited number of successive unsuccessful attempts greater than one to shift into the intended gear stage is detected by the electronic control unit, the transmission is shifted back into the original gear stage and a new attempt to shift into the intended gear stage is executed by the electronic control unit only if a new shift request is detected.

10. The transmission arrangement according to claim 9, wherein the electronic control unit has a comparing device for comparing a vehicle speed parameter to a parameter range that is dependent on an intended gear stage.

11. The transmission arrangement according to claim 10, wherein the electronic control unit is connected to a rotation speed sensor for detecting an output shaft rotation speed of the downstream manual transmission.

12. The transmission arrangement according to claim 11, wherein the electronic control unit has a determining section for determining at least one target rotation speed of a hydraulic motor of the hydrostatic transmission.

13. The transmission arrangement according to claim 10, wherein the electronic control unit has a determining section for determining at least one target rotation speed of a hydraulic motor of the hydrostatic transmission.

14. The transmission arrangement according to claim 9, wherein the electronic control unit is connected to a rotation speed sensor for detecting an output shaft rotation speed of the downstream manual transmission.

15. The transmission arrangement according to claim 14, wherein the electronic control unit has a determining section for determining at least one target rotation speed of a hydraulic motor of the hydrostatic transmission.

16. The transmission arrangement according to claim 9, wherein the electronic control unit has a determining section for determining at least one target rotation speed of a hydraulic motor of the hydrostatic transmission.

* * * * *